United States Patent [19]

Guenther

[11] Patent Number: 4,546,048

[45] Date of Patent: Oct. 8, 1985

[54] COMPOSITE THERMAL SHIELD FOR ENGINE COMPONENTS

[75] Inventor: William D. Guenther, Hagerstown, Ind.

[73] Assignee: Dana Corporation, Toledo, Ohio

[21] Appl. No.: 592,647

[22] Filed: Mar. 23, 1984

[51] Int. Cl.[4] ...................... B32B 15/14; B22D 19/00; F02F 3/02

[52] U.S. Cl. .................................... 428/608; 428/614; 123/193 P; 164/98

[58] Field of Search ............... 428/608, 621, 632, 627, 428/652, 653, 437, 615, 614, 595, 603; 123/193 P; 416/241 B; 92/248, 256; 164/111, 98, 97; 419/2, 5

[56] References Cited

U.S. PATENT DOCUMENTS

| | | | |
|---|---|---|---|
| 4,075,364 | 2/1978 | Panzera | 428/610 |
| 4,142,022 | 2/1979 | Erickson et al. | 428/432 |
| 4,245,611 | 1/1981 | Mitchell et al. | 123/193 P |
| 4,254,621 | 3/1981 | Nagumo | 123/193 P |
| 4,273,824 | 6/1981 | McComas et al. | 428/661 |
| 4,318,438 | 3/1982 | Ban et al. | 164/97 |
| 4,334,507 | 6/1982 | Köhnert et al. | 92/224 |
| 4,338,380 | 7/1982 | Erickson et al. | 428/594 |
| 4,404,262 | 9/1983 | Watmough | 428/539.5 |

FOREIGN PATENT DOCUMENTS

| | | | |
|---|---|---|---|
| 1751 | 5/1983 | Int'l Pat. Institute | 428/608 |
| 41622 | 4/1978 | Japan | 92/222 |
| 210140 | 12/1982 | Japan | 123/193 P |
| 15743 | 1/1983 | Japan | 123/193 P |
| 176631 | 5/1983 | Japan | 123/193 P |
| 1560311 | 2/1980 | United Kingdom . | |

*Primary Examiner*—L. Dewayne Rutledge
*Assistant Examiner*—John J. Zimmerman
*Attorney, Agent, or Firm*—Frank B. McDonald

[57] ABSTRACT

A composite thermal shield includes an external solid layer of heat and corrosion-resistant metal bonded to a permeable layer of metal. The composite is mechanically affixed to the substrate metal of an engine component, by a method wherein the substrate metal becomes entrained within the interstices of the permeable metal layer. In a first preferred form the permeable metal layer is comprised of a fibrous stainless steel woven wire mesh which is sintered or brazed to the external stainless steel heat and corrosion-resistant layer. In a preferred process, an aluminum substrate piston is formed to include the composite shield, whereby the aluminum is pressed into the permeable layer during formation of the piston in a mold. In a second preferred form, the piston includes an insulation layer wherein two layers of stainless steel wire mesh have an intermediate stainless steel layer sandwiched between them. The bottom layer of wire mesh is subjected to the aforedescribed mechanical bonding with the substrate aluminum, while the upper layer, positioned between the top and intermediate stainless steel layers, operates purely as an insulation layer.

13 Claims, 2 Drawing Figures

COMPOSITE THERMAL SHIELD FOR ENGINE COMPONENTS

BACKGROUND OF THE INVENTION

This invention relates generally to the preparation and use of thermal shields for engine components. More particularly, the invention relates to compositions of purely metallic layers for such purposes.

Internal combustion engines become more efficient as piston face skin temperatures become higher. A thermal shield will permit considerably higher face skin temperatures without failure of a piston head than otherwise possible under conventional practices.

Numerous prior art composite thermal shields have been suggested, but few have realized practical success. Most have included an exposed ceramic layer employed in combination with adjoining underlying layers of other thermally insulative materials such as metallic insulation. Typically, the ceramic layers are applied to the metallic layers by electrostatic deposition techniques, and more popularly via plasma spray. A principal drawback of prior art ceramic composites as utilized with metallic layers has been the difficulty of adherence of ceramics to metallic materials. In fact, many of the failures of ceramics are attributable to bonding agents employed to create durable adherence of ceramics to metals. Often, the ceramics are subject to either catastrophically breaking apart, or gradually flaking away under the severe conditions of combustion.

SUMMARY OF THE INVENTION

The composite thermal shield disclosed herein involves a significantly improved system for securement thereof to the metallic substrate of an engine component. As such, the attachment mechanism of the shield alleviates the engine durability problems associated with prior art bonding systems. In a preferred form, an external solid layer of heat and corrosion resistant metal, preferably of stainless steel, is employed as either a preformed sheet layer or an electrostatically deposited layer. The solid metal layer is first bonded to a permeable metal layer to form a composite. The composite is then mechanically affixed to the substrate metal of an engine component by substantial entrainment or infiltration of the substrate metal into the permeable metal layer. In a preferred form, the infiltration is achieved during a mold process wherein the substrate material, for example an aluminum alloy, is forced into the permeable layer of the composite while the substrate metal is in its molten state. Upon formation, the component is removed from the mold, and includes the composite thermal shield having an external heat and corrosion resistant metal layer forming the exposed portion thereof for direct subjection to a combustion environment.

In an alternate preferred embodiment, a dual permeable layer is employed, with a metallic foil or "barrier" positioned intermediate two layers of permeable metal. The upper layer of the permeable metal is contained between the exposed corrosion-resistant layer and the metallic foil layer, and thus acts as an insulation layer. The lower permeable layer provides the mechanical securement of the composite as hereinabove described, while the barrier prevents molten metal from infiltrating the upper permeable layer.

DETAILED DESCRIPTION OF PREFERRED EMBODIMENTS

Although the invention disclosed herein is suitable for engine components generally, one preferred embodiment of its use involves piston head construction.

Figure 1:
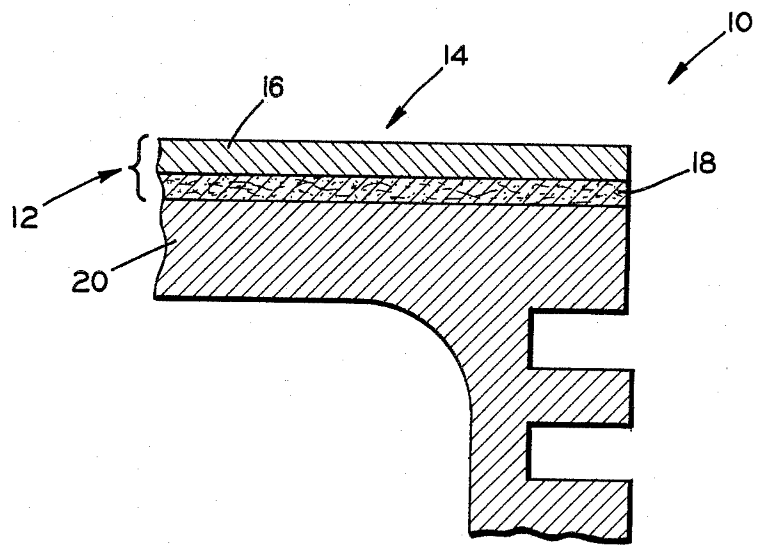
FIG. 1 is a fragmentary cross-sectional view of a piston which contains the composite thermal shield of the present invention.

Referring first to FIG. 1, a piston 10 is an example of an engine component utilizing a composite thermal shield 12 at its upper or face portion 14. The composite thermal barrier 12 consists of two metallic layers, an external, exposed layer 16 of a high heat and corrosion resistant metal, and a layer 18 of a permeable metal as, for example, a filamentary metallic mesh. The two metallic layers 16 and 18 are preferably sintered or brazed together, although they alternatively may be bonded together by other means, such as spot or resistance welding. As another example, the solid layer 16 may be electrostatically deposited onto the permeable layer 18. In the preferred embodiment as herein described, a solid stainless steel layer 16 and a layer of filamentary stainless steel mesh 18, are sintered together by a diffusion bonding process in an inert environment at approximately 2100° F.

In the preferred embodiment of the piston 10, the body thereof is comprised of an aluminum alloy substrate metal 20. Attachment of the composite thermal shield 12 to the aluminum substrate metal 20 under the present invention may be accomplished by any means which will cause the substrate metal 20 to become entrained or infiltrated within the interstices of the permeable metal layer 18. In the embodiment as herein described, the preferred method is to provide for such mechanical affixation during the formation of the piston 10 in a molding process wherein molten aluminum substrate is poured and maintained at 1200 to 1300 degrees Fahrenheit, while the mold is subjected to pressures of approximately ten thousand pounds per square inch. Ranges of temperature and pressure will depend at least in part upon the metal alloy involved. In the preferred form, a piston mold (not shown) accommodates an "upset" piston casting technique in which the piston is cast in an inverted or face down position. Layers 16 and 18 are first joined together preferably in a flat sheet form, wherein a die is then employed to form the composite 12 under one of the methods hereinabove described. The formed composite is then placed into the mold with the external solid metal layer 16 at the bottom thereof, and the permeable metal layer 18 facing upwardly therefrom. The piston substrate metal 20 is then poured as a molten liquid over the composite 12, and is placed under sufficient pressure to force it into the interstices of the permeable layer 18. Under the preferred practice of the present invention, penetration of the permeable metal layer 18 by the substrate metal 20 of the piston body 10 is virtually one hundred percent.

In the embodiment of FIG. 1, it is not necessary that the exposed solid layer 16 extend downwardly over the edges or sides of the permeable layer 18 and to contact the substrate metal 20 for full enclosure of the layer 18. Thus there is no need for enclosing the permeable metal layer 18, as the layer 18 becomes fully entrained with substrate metal 20, and does not act primarily as an insulation layer.

Figure 2:
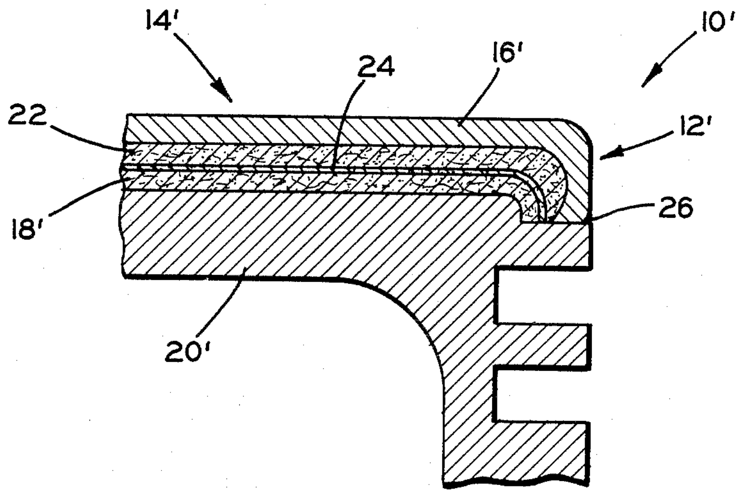
FIG. 2 is a fragmentary cross-sectional view of an alternate preferred embodiment.

Referring now to FIG. 2, a piston 10' includes a second preferred embodiment of a composite thermal shield 12' which includes an insulation layer 22. The composite 12' comprises four distinct layers, including layers 16' and 18' which are analogous to the solid and permeable layers, respectively, of the embodiment of the piston 10 of FIG. 1. The composite 12' however includes two additional layers which are sandwiched between the analogous layers 16' and 18'. Thus, an insulation layer 22, although formed of a permeable metal identical to that used to form the layer 18', is disposed for remaining entirely free of entrainment or infiltration by the substrate metal 20' of the piston body 10'. An internal solid layer 24, also preferably of the same metal of the permeable layers 18' and 22 for ease of bonding, is sandwiched intermediate the two permeable metal layers. Thus, it will be seen by those skilled in the art that the intermediate solid layer 24 will permit only the lower permeable metal layer 18' to become entrained with the substrate metal 20 during formation of the piston 10'. The upper permeable layer 22 will remain free and clear of any substrate metal 20, and will thus act purely as an insulative element. The layer 24 acts as a barrier to any amount of substrate metal infiltration into the layer 22, and thus insures that the insulation layer 22 will function as intended. Without a barrier 24, the integrity of the insulation layer 22 would not be easily controlled during the casting process.

Although the embodiment of this invention as shown in FIG. 2 includes only one permeable insulation layer 22 between an "external" solid metal layer 16' and a "barrier" solid metal layer 24, the present invention is nonetheless amenable to incorporation of several such insulation layers 22. For example, in applications subject to extreme temperature ranges, it may be desirable to employ several such layers 22, each sandwiched between pairs of intermediate solid metal layers 24. In such cases, the additional intermediate solid layers 24 would not act as barriers to substrate metal infiltration, but would operate to insure the insulative capacities of each of the permeable layers 22. Thus each layer 22 would have its own insulative effect apart from that of any adjacent layer 22, which for some reason might be insulatively defective or inadequate. This invention therefore also incorporates the concept of building up or of "layering" such insulation layers 22.

By comparison with the embodiment of the piston 10 shown in FIG. 1, the exposed high heat and corrosion resistant metal layer 16' of FIG. 2 completely covers and encloses all areas of the permeable metal layer 22, the edge 26 thereof extending down over the sides of the layer 22 to contact the substrate metal 20. The edge 26 may either be pinched or welded to the "barrier" layer 24. The insulation layer 22 is thereby rendered totally impervious to combustion gases and particulates, and hence functions fully as an insulative element.

The insulation layer 22 of FIG. 2 is normally entrained with air, and of course will only provide an insulative effect if the air is absolutely trapped. Alternatively, however, the interstices of the permeable insulation layer 22 may be filled with an inert gas other than air, or may even be under a vacuum.

Although the invention hereof has been described and detailed with respect to a piston 10,10', the invention is fully suitable for numerous other engine components, such as cylinder heads, with particular emphasis on combustion chamber, exhaust port, and intake valve areas. Certain other cylinder related components such as cylinder bores, sleeves, and/or liners may also be suitable for practice of the present invention. Moreover, although the preferred metallic layers employed in the present invention are described in terms of solid stainless steel and stainless fibrous layers over the substrate metal of aluminum, other composite layers may be utilized within the logical scope of this invention. Thus, besides stainless steel as an example of a heat and corrosion resistant metal are several other alloys including tungsten, palladium, and certain nickle and chrome alloys. As a substitute for the fibrous metal layers 18, 22, and 18', other permeable metallic layers may be employed, as for example a metallic skeletal structure. An example of the latter is DUOCEL* material, a rigid, highly porous, fully permeable metallic structure with a controlled density of metal per unit volume, and commercially available in many different metals. Finally, one alternate metal for the aluminum subtrate metal 20 might be cast iron.

By way of specific example, certain preferred specific metal compositions and layer thicknesses have been utilized in the above-described formations of composite thermal barriers 12,12' for attachment to the substrate metal 20,20' of piston faces 14,14'. If, for example, an electrostatically deposited stainless steel layer 16,16' is utilized, such a layer may be formed of a METCO 41-C* powder stainless steel of an approximately 0.015–0.020 inch thickness. If a preformed layer 16,16' is utilized, the layer may be formed of a 0.020–0.025 inch thick sheet of an AISI 304 stainless steel stock, and is preferably sintered or brazed directly onto the permeable metal layer 18, 22 prior, of course, to the upset casting technique described. The layers 18, 22, and 18' in one preferred embodiment are approximately 0.040 to 0.060 inch thick stainless steel wire mesh, having a metal to air density of 65%, an ASTM mesh of 18, and formed of AISI C-14 wire.

*Registered Trademarks

In another preferred embodiment the layers 18, 22 and 18' are comprised of a woven fiber metal, available in either A.I.S.I. type 316 or type 304 stainless steels. The woven nature of the latter choices provides for consistent quality control of desired densities of diffusion bonded wire. For example, one successful embodiment employed a 60 mesh screen with a wire diameter of 0.0075 inch.

Finally, although several preferred embodiments have been detailed and described herein-above, numerous other variations of the invention are envisioned to fall within the scope of the appended claims.

What is claimed is:

1. An engine component comprising a substrate metal and having a composite thermal shield covering a portion of an external surface of said component, said composite shield comprising an external solid metal layer, a first layer of permeable metal bonded to said external solid metal layer, an internal solid metal layer, and a second permeable metal layer, said internal solid metal layer positioned intermediately of and bonded on its opposed sides to said first and second permeable metal layers, wherein the interstices of said second permeable metal layer are substantially filled with said substrate metal, whereby said composite thermal shield is mechanically affixed to the substrate metal of said engine component, and wherein said substrate metal extends into said interstices of only said second permeable metal layer, said internal solid metal layer being disposed for preventing substrate metal from entering said first layer of permeable metal during manufacture of said component.

2. The engine component of claim 1, wherein said first solid metal layer extends over both top and edge portions of said first permeable metal layer.

3. The engine component of claim 1 wherein said first solid metal layer comprises a stainless steel.

4. The engine component of claim 1 wherein said first solid metal layer comprises a tungsten alloy.

5. The engine component of claim 1 wherein said first solid metal layer comprises an alloy of palladium.

6. The engine component of claim 1 wherein said first solid metal layer comprises a nickel and chrome alloy.

7. The engine component of claim 1 wherein said permeable metal is comprised of a filamentary wire mesh.

8. The engine component of claim 1 wherein said permeable metal is comprised of a filamentary wire mesh, and wherein said filamentary wire mesh comprises woven layers of stainless steel.

9. The engine component of claim 1 wherein said permeable metal is comprised of a metallic skeletal material.

10. The engine component of claim 1 wherein said substrate metal is an aluminum alloy.

11. The engine component of claim 1 wherein said substrate metal is cast iron.

12. A method of forming a composite thermal shield in combination with a member of an internal combustion engine formed of a substrate metal, said method comprising the steps of bonding a first solid layer of metal to one face of a first layer of permeable metal, bonding a second solid layer of metal to the opposite face of said first layer of permeable metal, bonding a second layer of permeable metal to said second solid layer of metal, and casting said substrate metal into said second permeable metal layer.

13. The method of claim 12 wherein said casting step includes application of pressure in the range of ten thousand pounds per square inch.

* * * * *